(No Model.)

I. T. QUINN.
TANK FOR CURING FLAX.

No. 329,949. Patented Nov. 10, 1885.

WITNESSES

INVENTOR
Isaac T. Quinn.
By his Attorneys

UNITED STATES PATENT OFFICE.

ISAAC T. QUINN, OF MORRIS, ILLINOIS, ASSIGNOR OF TWO-THIRDS TO F. B. HANDWERK AND S. C. STOUGH, OF SAME PLACE.

TANK FOR CURING FLAX.

SPECIFICATION forming part of Letters Patent No. 329,949, dated November 10, 1885.

Application filed June 12, 1885. Serial No. 168,546. (No model.)

*To all whom it may concern:*

Be it known that I, ISAAC T. QUINN, a citizen of the United States, residing at Morris, in the county of Grundy and State of Illinois, have invented a new and useful Improvement in Tanks for Curing Flax, of which the following is a specification, reference being had to the accompanying drawings.

My invention relates to an improvement in tanks for curing flax; and it consists in the peculiar construction and combination of devices that will be more fully set forth hereinafter, and particularly pointed out in the claims.

Figure 1:
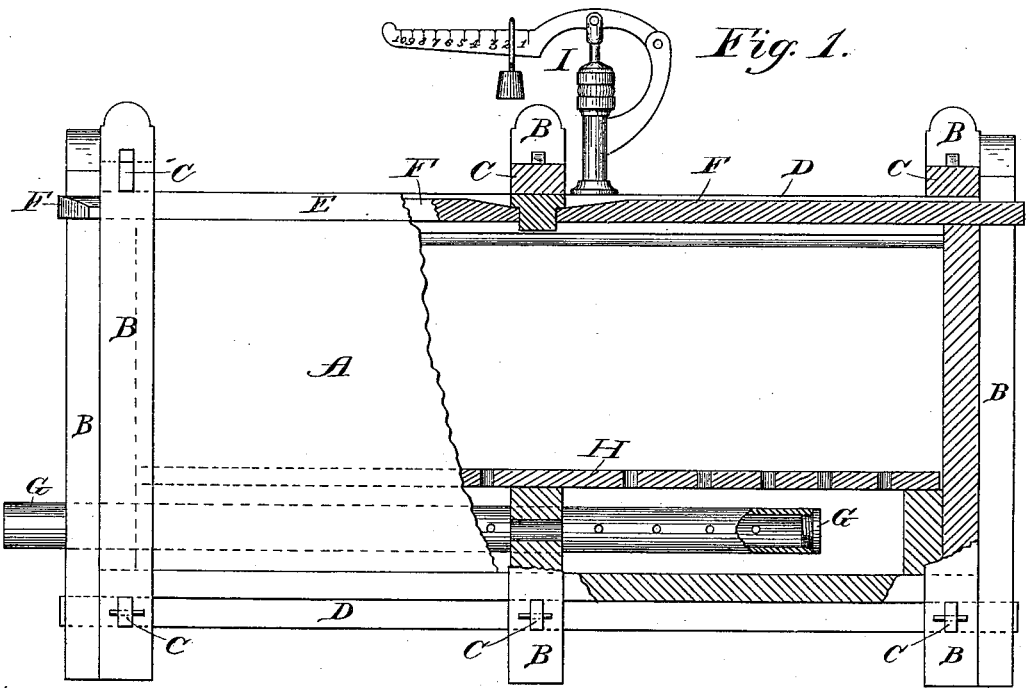
Figure 2:
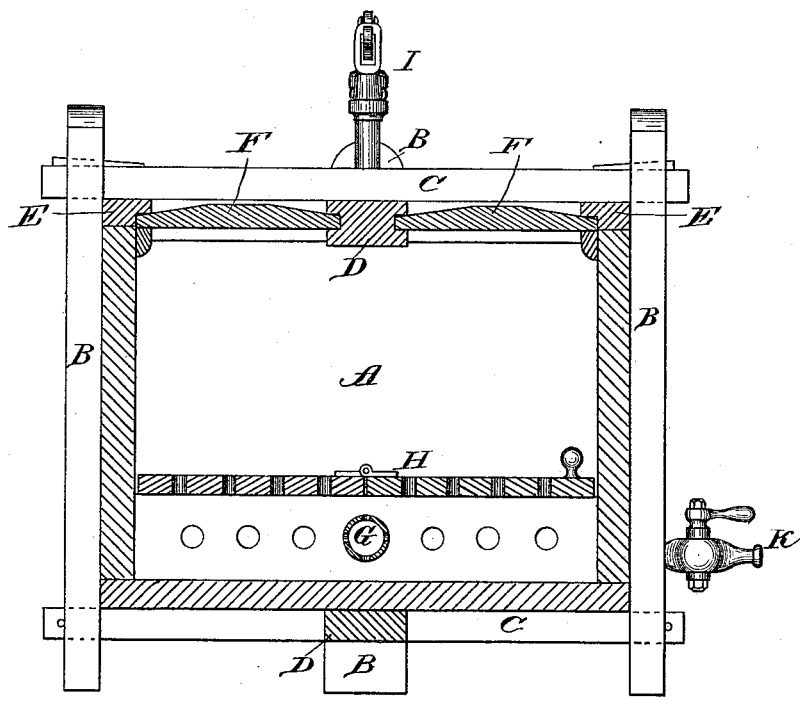

In the accompanying drawings, Figure 1 is a side elevation of a tank embodying my invention, partly in section. Fig. 2 is a vertical transverse sectional view of the same.

A represents a rectangular tank, which is preferably made of wood, and firmly braced and secured together, so as to be steam-tight. To this end the tank is inclosed in a frame consisting of the vertical beams B, the cross or tie beams C, mortised in the beams B, and the central longitudinal beams, D, and outer longitudinal beams, E. The beams B are arranged on the outer sides of the tank, and the beams C, D, and E are on the top and bottom thereof. The top is composed of slides F, which work in grooves in the beams D and E, and which permit free access to the interior of the tank, and are adapted to close the same steam-tight. In the bottom of the tank is a perforated steam-pipe, G, the function of which is to introduce steam from any suitable boiler or other generator or source into the tank. The perforations with which this pipe is provided distribute the steam evenly over the bottom of the tank. Above the pipe G is located a false bottom, H, which is perforated, and is made in two longitudinal hinged sections adapted to be raised so as to disclose the bottom. A weighted valve, I, is located in the top of the tank for regulating the pressure of steam therein, and a blow-off cock, K, is provided for the bottom of the tank to get rid of the water resulting from condensation. The flax to be cured preparatory to being made into linen is placed in loose bundles on the false bottom until the tank is filled, when the sliding lids are closed and the flax subjected to the action of steam for a sufficient length of time. The steam is maintained at a pressure of about two pounds to the square inch by the regulating-valve. Flax thus treated is rendered very soft and fine and can be wrought into linen of the finest quality and of a very glossy appearance.

Having thus described my invention, I claim—

1. A tank for treating flax, having a perforated steam-injecting pipe and a valve for regulating the pressure of steam in the tank, substantially as described.

2. The tank for treating flax, having the perforated steam-injecting pipe and the hinged false bottom above the pipe to prevent the flax from coming in direct contact with the pipe, substantially as described.

3. The tank for treating flax, having the perforated steam-injecting pipe, the perforated false bottom above the pipe, and the slides to permit access to the flax in the tank, substantially as described.

4. The tank for treating flax, having the perforated steam-injecting pipe, the perforated false bottom above the pipe, the slides to permit access to the flax in the tank, the regulating escape-valve to maintain the steam-pressure in the tank at a suitable point, and the blow-off cock for the water resulting from the condensation of the steam in the tank, substantially as described.

In testimony that I claim the foregoing as my own I have hereto affixed my signature in presence of two witnesses.

ISAAC T. QUINN.

Witnesses:
JOHNIE ZIMMERMAN,
JAMES DEVENZY.